Aug. 14, 1923.

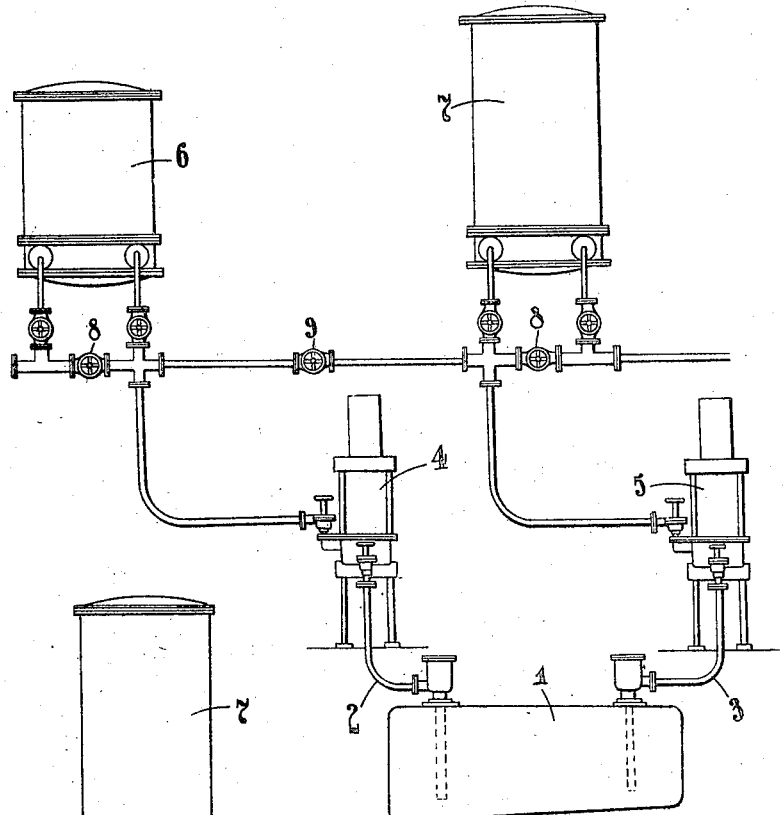
Fig.1.
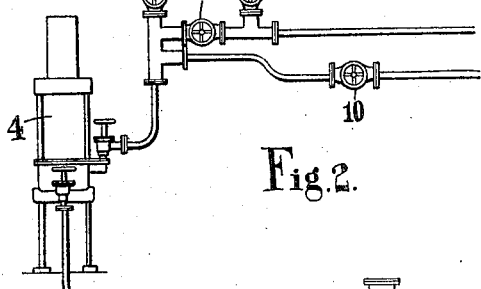
Fig.2.
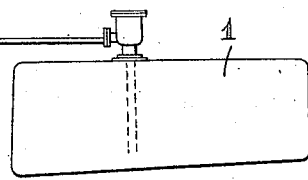
INVENTORS:
CHARLES A. PARSONS,
STANLEY S. COOK.

C. A. PARSONS ET AL 1,464,828

FORCED LUBRICATION SYSTEM

Filed July 7, 1920

INVENTORS:
CHARLES A. PARSONS,
STANLEY S. COOK.

by Spear, Middleton, Donaldson r Hall
Attys.

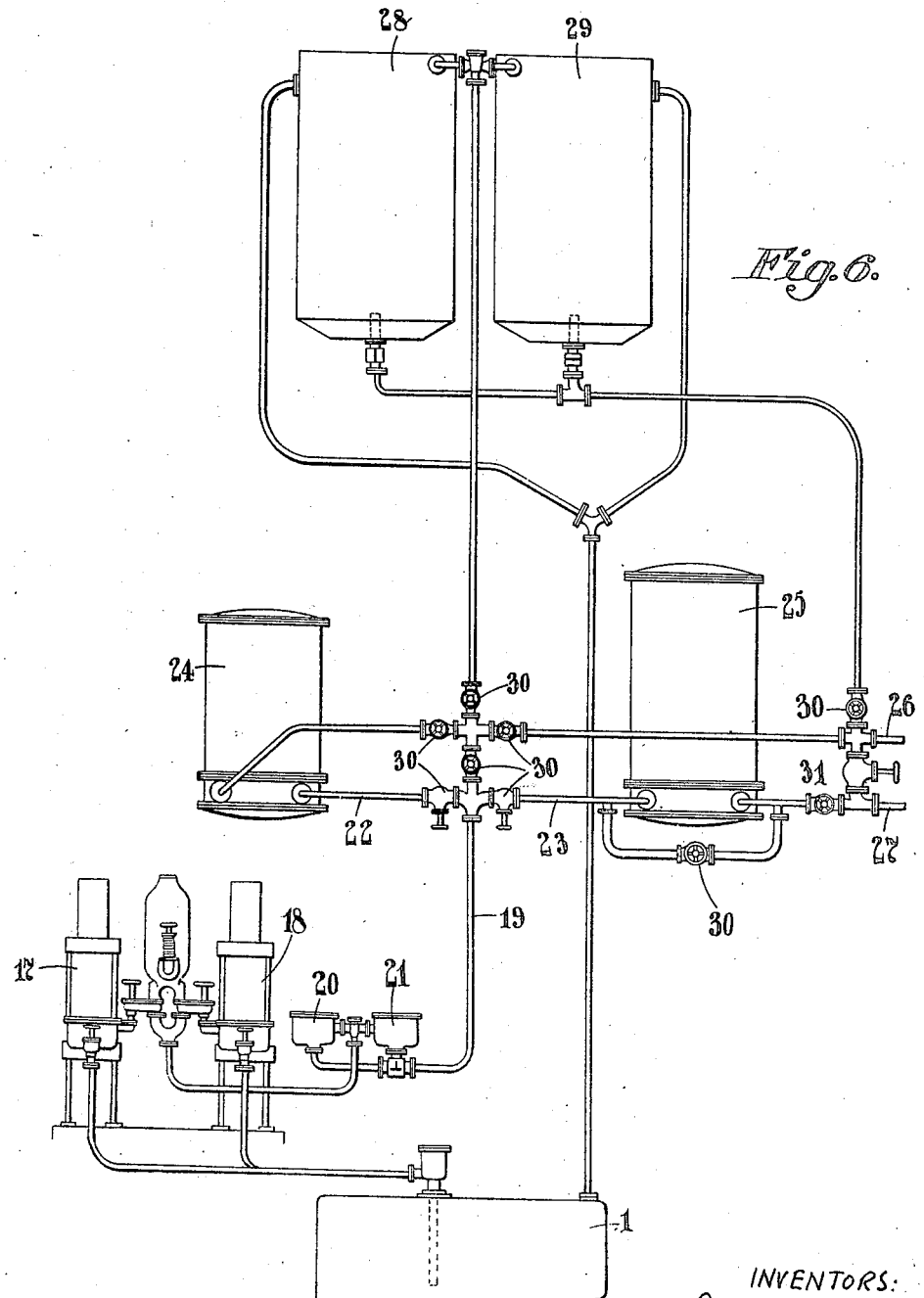

Patented Aug. 14, 1923.

1,464,828

UNITED STATES PATENT OFFICE.

CHARLES ALGERNON PARSONS AND STANLEY SMITH COOK, OF NEWCASTLE-UPON-TYNE, ENGLAND; SAID COOK ASSIGNOR TO SAID PARSONS.

FORCED-LUBRICATION SYSTEM.

Application filed July 7, 1920. Serial No. 394,548.

*To all whom it may concern:*

Be it known that we, CHARLES ALGERNON PARSONS and STANLEY SMITH COOK, both subjects of the King of Great Britain and Ireland, and both residing at Heaton Works, Newcastle-upon-Tyne, in the county of Northumberland, England, have invented certain new and useful Improvements in and Relating to Forced-Lubrication Systems, of which the following is a specification.

The present invention relates to forced lubrication systems and is more particularly applicable to the lubrication systems of geared turbines.

In a geared turbine system it is desirable that the oil supplied to the high speed turbine and pinion bearings should have a low viscosity in order to keep down the frictional loss, while it is also desirable that the oil supplied to lubricate the interengaging gear teeth should have a high viscosity so as not to be so readily squeezed out by high local pressures at the points of contact of the teeth.

In order to meet these conditions it has already been proposed to provide two entirely separate and independent lubricating systems, one supplying light oil to the high speed bearings and the other supplying heavy oil to the gear teeth. There are practical objections to this proposal as in addition to the increase in the plant, in the supervision required and in the likelihood of a breakdown in the system, there is a considerable complication involved in separating, in the drain system, the pinion bearing oil from the oil supplied to the teeth.

This system also involves the carrying in the ship of two different qualities of lubricating oil for reserve with risk of substitution.

The object of the invention is to obviate the above-mentioned disadvantages by means of a lubrication system in which it is possible to use a single grade of oil for both the above-mentioned purposes.

The invention consists in the combination of elements hereinafter described and particularly pointed out in the claims.

In order that the carrying of the invention into effect may be understood, reference will now be made to the accompanying drawing in which:

Figure 1 illustrates diagrammatically a lubrication system in which separate pumps and coolers supply lubricant to individual mechanisms.

Fig. 2 shows diagrammatically a system in which a single pump delivers oil through a cooler to a mechanism, a portion of oil from the pump being shunted directly to another mechanism.

Fig. 6 illustrates diagrammatically a lubrication system including duplicate pumps, coolers of varying capacities and duplicate gravity tanks.

Figure 3:
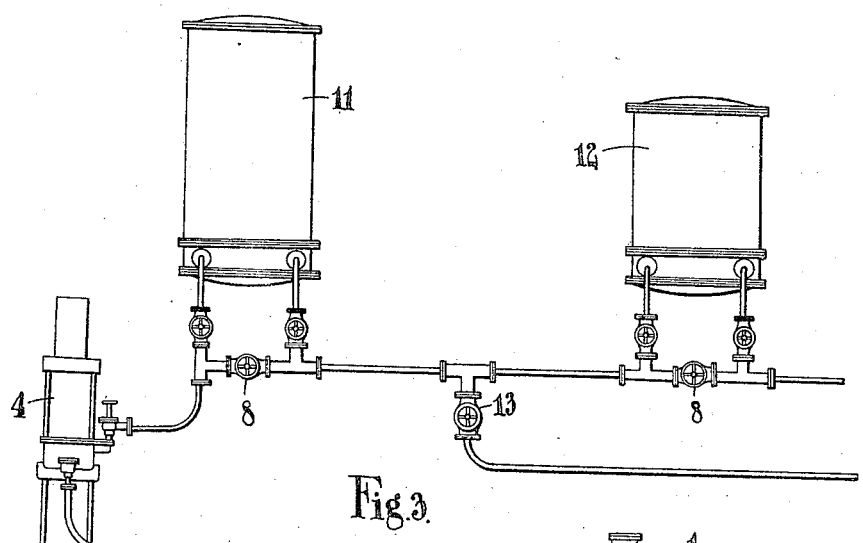
Fig. 3 shows diagrammatically a system in which the entire supply of oil passes through one cooler, from which a portion is supplied direct to a mechanism, the remaining portion passing through an additional cooler.
Figure 4:
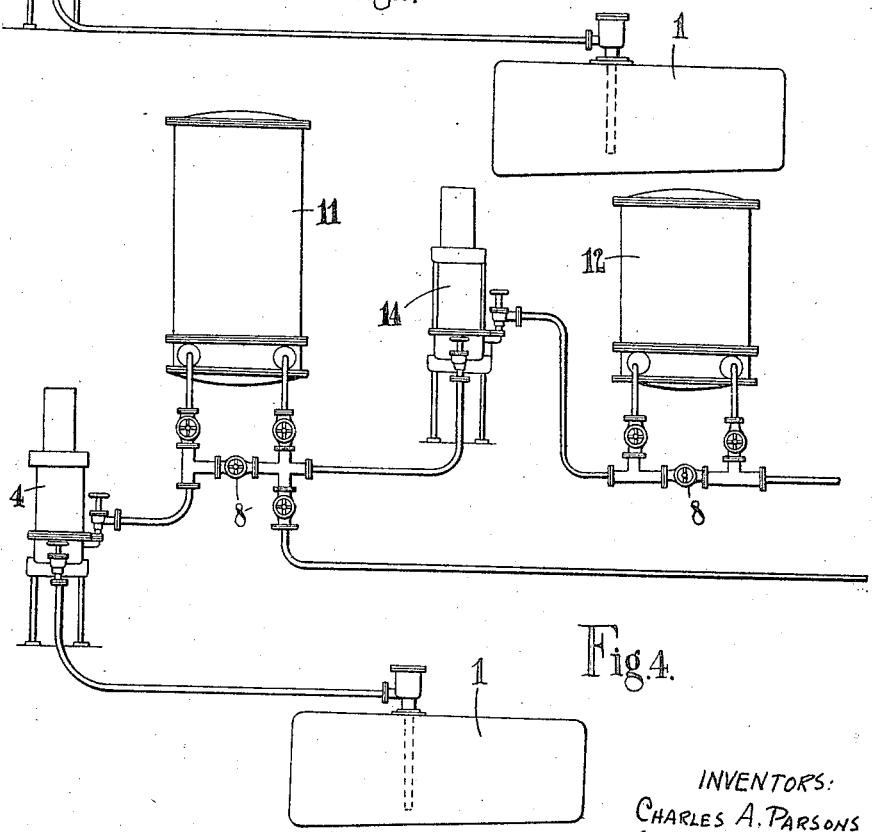
Fig. 4 illustrates diagrammatically the system of Fig. 3 with a supplemental pump placed in circuit to assist in supplying oil to the supplemental cooler.
Figure 5:
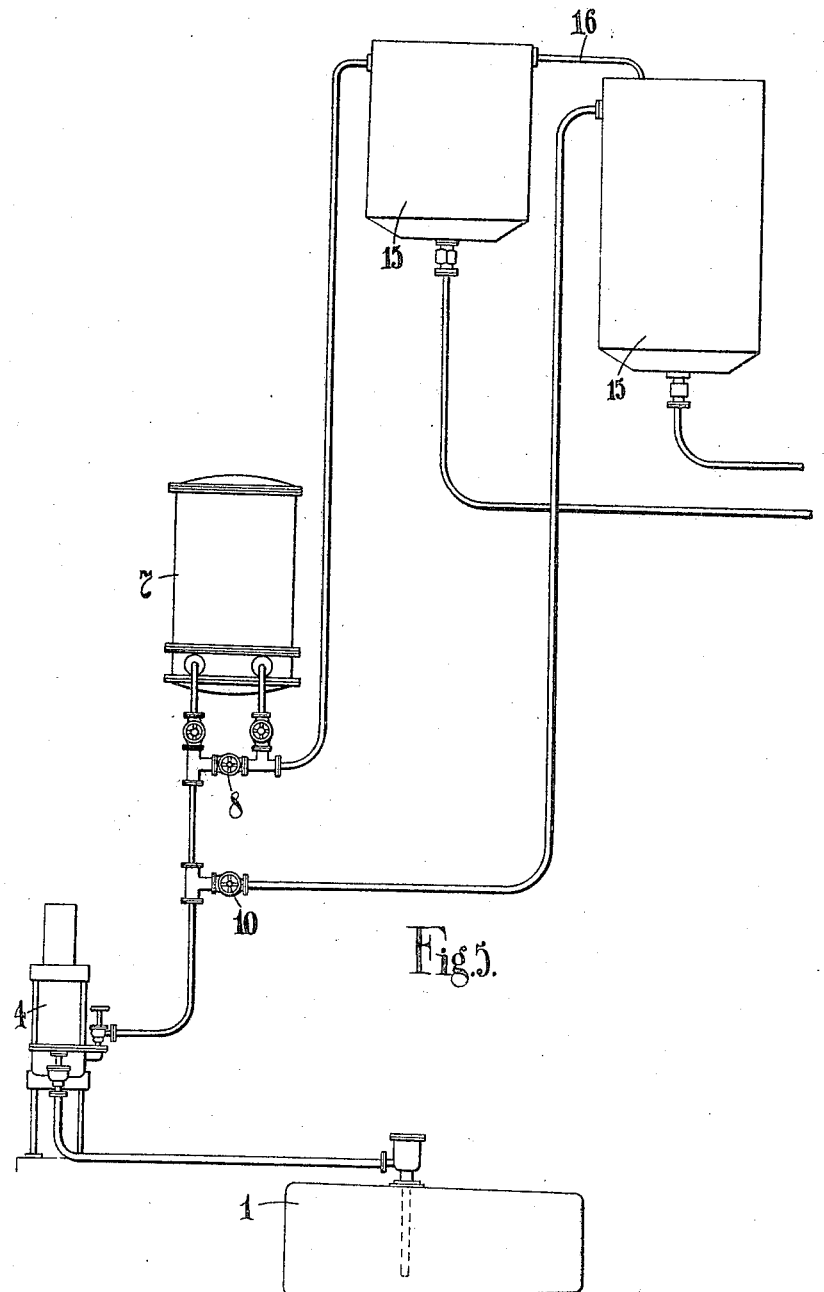
Fig. 5 is a view similar to Fig. 2 with gravity tanks placed between the cooler outlets and the mechanism to be lubricated.

In carrying the invention into effect in the manner illustrated by the accompanying drawings, we provide a common drain tank 1 to receive oil from both the bearings and the gearing. Duplicate pumps 17 and 18 are provided either or both of which may be employed to deliver oil from the common drain tank 1 to a common delivery pipe 19 through strainers 20, 21. Branches 22, 23 respectively lead from the pipe 19 to coolers 24, 25 supplying oil to the bearings and gearing respectively by pipes 26, 27. Duplicate gravity tanks 28, 29 are provided and are connected to the coolers, the supply pipes 26, and 27 and the drain tank 28 in the manner indicated.

By means of valves 30 placed as shown it is possible to supply oil from the pumps to one of the coolers and thence to the gravity tanks from which oil is delivered to the bearings and gearing. The valve 31 is a non-return valve and is provided so that in the event of the pressure in the system supplying the gear falling too low the supply will be automatically augmented by oil from the system supplying the bearings. A similar valve, but non-return in the opposite direction, may be fitted in parallel with the valve 31 in order that, in case of failure of the system supplying the gearing, oil may pass from that feeding the bearings to the deficient system.

We have only referred to two divisions in the oil supply with different degrees of cooling in each, but it is of course possible to have several divisions, the bearings having the highest speeds or lightest loads being supplied with the hottest oil, the bearings having lower speeds or greater loads with cooler oil, and the gear sprayers with the coolest oil. Again the subdivision may be different in character to that indicated above. For instance, the lower speed bearings may be supplied with the same oil as the gear sprayers.

Instead of a common drain tank, we may use a drain tank divided by a partition, and allow the oil from the gearing to drain to the space on one side of this partition, and that from the turbine bearings to the other. This partition would have overflow openings to prevent excess of oil accumulating on either side of it through intermixing of the discharge from any of the bearings with that from the gearing. The effect of such an arrangement would be to establish a permanently colder system on one side than on the other, and diminish the amount of cooling to be done in each circulation.

Having now particularly described and ascertained the nature of our said invention and in what manner the same is to be performed, we declare that what we claim is:—

1. The combination in a lubrication system comprising a plurality of branches using a single grade of lubricant, of conduits leading to the parts to be lubricated which require lubricant of different viscosities, a common drain tank collecting lubricant from said parts, separate coolers connected to said conduits for differentially cooling said collected lubricant and thereby altering its viscosity, means for passing lubricant from said drain tank to said coolers and a gravity tank in the various branches each supplying oil at a different viscosity, as set forth.

2. The combination in a lubrication system comprising a plurality of branches using a single grade of lubricant, of conduits leading to the parts to be lubricated which require lubricant of different viscosities, a common drain tank collecting lubricant from said parts, separate coolers connected to said conduits for differentially cooling said collected lubricant and thereby altering its viscosity, means for passing lubricant from said drain tank to said coolers, a gravity tank in the various branches each supplying oil at a different viscosity, and overflow pipes from the gravity tanks to the drain tank, as set forth.

3. The combination in a lubrication system comprising a plurality of branches using a single grade of lubricant, of conduits leading to the parts to be lubricated which require lubricant of different viscosities, a common drain tank collecting lubricant from said parts, separate coolers connected to said conduits for differentially cooling said collected lubricant and thereby altering its viscosity, means for passing lubricant from said drain tank to said coolers, gravity tanks in the various branches each supplying oil at a different viscosity, overflow pipes from the gravity tanks to the drain tank, and overflow pipes from one gravity tank to another, as set forth.

4. The combination in a lubrication system comprising a plurality of branches using a single grade of lubricant, of conduits leading to the parts to be lubricated which require lubricant of different viscosities, a common drain tank collecting lubricant from said parts, separate coolers connected to said conduits for differentially cooling said collected lubricant and thereby altering its viscosity, means for passing lubricant from said drain tank to said coolers, a gravity tank in the various branches each supplying oil at a different viscosity, overflow pipes from the gravity tanks to the drain tank, overflow pipes from one gravity tank to another, the said passing means delivering oil partly to the cooler and partly directly to the machine, as set forth.

5. The combination in a lubrication system comprising a plurality of branches using a single grade of lubricant, of conduits leading to the parts to be lubricated which require lubricant of different viscosities, a common drain tank collecting lubricant from said parts, separate coolers connected to said conduits for differentially cooling said collected lubricant and thereby altering its viscosity, a gravity tank in the various branches each supplying oil at a different viscosity, overflow pipes from the gravity tanks to the drain tank, overflow pipes from one gravity tank to another, duplicate pumps drawing oil from a common drain tank, a common pipe supplying the coolers and gravity tanks, and a series of valves for controlling the flow of oil.

6. The combination in a lubrication system comprising a plurality of branches using a single grade of lubricant, of conduits leading to the parts to be lubricated which require lubricant of different viscosities, a common drain tank collecting lubricant from said parts, separate coolers connected to said conduits for differentially cooling said collected lubricant and thereby altering its viscosity, a gravity tank in the various branches each supplying oil at a different viscosity, overflow pipes from the gravity tanks to the drain tank, overflow pipes from one gravity tank to another, pumps drawing oil from the common drain tank and delivering it through the coolers in parallel, and a series of valves whereby the oil discharged through one cooler passes to a gravity tank and the oil discharged through the other cooler passes directly to the parts to be lubricated, as set forth.

7. The combination in a lubrication system comprising a plurality of branches using a single grade of lubricant, of conduits leading to the parts to be lubricated which require lubricant of different viscosities, a common drain tank collecting lubricant from said parts, separate coolers connected to said conduits for differentially cooling said collected lubricant and thereby altering its viscosity, a gravity tank in the various branches each supplying oil at a different viscosity, overflow pipes from the gravity tanks to the drain tank, overflow pipes from one gravity tank to another, pumps drawing oil from the common drain tank and delivering it through the coolers in parallel, a series of valves whereby the oil discharged through one cooler passes to a gravity tank and the oil discharged through the other cooler passes directly to the parts to be lubricated, a bye-pass pipe between the inlet and outlet of the coolers, and a shut-off valve therein, as set forth.

8. The combination in a lubrication system comprising a plurality of branches using a single grade of lubricant, of conduits leading to the parts to be lubricated which require lubricant of different viscosities, a common drain tank collecting lubricant from said parts, separate coolers connected to said conduits for differentially cooling said collected lubricant and thereby altering its viscosity, a gravity tank in the various branches each supplying oil at a different viscosity, overflow pipes from the gravity tanks to the drain tank, overflow pipes from one gravity tank to another, pumps drawing oil from the common drain tank and delivering it through the coolers in parallel, a series of valves whereby the oil discharged through one cooler passes to a gravity tank and the oil discharged through the other cooler passes directly to the parts to be lubricated, a bye-pass pipe between the inlet and outlet of the coolers and a shut-off valve therein, and a bye-pass pipe between the inlet of the gravity tanks and a shut-off valve therein, as set forth.

9. The combination in a lubrication system comprising a plurality of branches using a single grade of lubricant, of conduits leading to the parts to be lubricated which require lubricant of different viscosities, a common drain tank collecting lubricant from said parts, separate coolers connected to said conduits for differentially cooling said collected lubricant and thereby altering its viscosity, a gravity tank in the various branches each supplying oil at a different viscosity, overflow pipes from the gravity tanks to the drain tank, overflow pipes from one gravity tank to another, pumps drawing oil from the common drain tank and delivering it through the coolers in parallel, a series of valves whereby the oil discharged through one cooler passes to a gravity tank and the oil discharged through the other cooler passes directly to the parts to be lubricated, a bye-pass pipe between the inlet and outlet of the coolers and a shut-off valve therein, a bye-pass pipe between the inlet and outlet of the gravity tanks and a shut-off valve therein, a drain tank for each condition of oil, and means whereby an excess of oil of one condition can overflow into the tank containing oil of another condition, as set forth.

10. The combination in a lubrication system comprising a plurality of branches using a single grade of lubricant, of conduits leading to the parts to be lubricated which require lubricant of different viscosities, a common drain tank collecting lubricant from said parts, separate coolers connected to said conduits for differentially cooling said collected lubricant and thereby altering its viscosity, a gravity tank in the various branches each supplying oil at a different viscosity, overflow pipes from the gravity tank to the drain tank, overflow pipes from one gravity tank to another, pumps drawing oil from the common drain tank and delivering it through the coolers in parallel, a series of valves whereby the oil discharged through one cooler passes to a gravity tank and the oil discharged through the other cooler passes directly to the parts to be lubricated, a bye-pass pipe between the inlet and outlet of the coolers and a shut-off valve therein, and a bye-pass pipe between the inlet and outlet of the gravity tanks and a shut-off valve therein, a common drain tank, partitions in the said drain tank providing a separate compartment for each condition of oil, and means whereby an excess of oil of one condition can overflow into the compartment containing oil of another condition, as set forth.

11. The combination in a lubrication system comprising a plurality of branches using a single grade of lubricant, of conduits leading to the parts to be lubricated which require lubricant of different viscosities, a common drain tank collecting lubricant from said parts, separate coolers connected to said conduits for differentially cooling said collected lubricant and thereby altering its viscosity, a gravity tank in the various branches each supplying oil at a different viscosity, overflow pipes from the gravity tanks to the drain tank, overflow pipes from one gravity tank to another, duplicate pumps drawing oil from a common drain tank, a common pipe supplying the coolers and gravity tanks, a series of valves for controlling the flow oil, and a non-return valve situated in the pipe delivering the oil from the cooler and the gravity tanks, whereby if the pressure in one delivery pipe falls too low, oil will automatically pass into it from the other delivery pipe, as set forth.

12. The combination in a lubrication system comprising a plurality of branches using a single grade of lubricant, of conduits leading to the parts to be lubricated which require lubricant of different viscosities, a common drain tank collecting lubricant from said parts, separate coolers connected to said conduits for differentially cooling said collected lubricant and thereby altering its viscosity, a gravity tank in the various branches each supplying oil at a different viscosity, overflow pipes from the gravity tanks to the drain tanks, overflow pipes from one gravity tank to another, pumps drawing oil from the common drain tank and delivering it through the coolers in parallel, a series of valves whereby the oil discharged through one cooler passes to a gravity tank and the oil discharged through the other cooler passes directly to the parts to be lubricated, and a non-return valve situated in the pipe delivering the oil from the cooler and the gravity tanks, whereby if the pressure in one delivery pipe falls too low, oil will automatically pass into it from the other delivery pipe, as set forth.

13. The combination in a lubrication system comprising a plurality of branches using a single grade of lubricant, of conduits leading to the parts to be lubricated which require lubricant of different viscosities, a common drain tank collecting lubricant from said parts, separate coolers connected to said conduits for differentially cooling said collected lubricant and thereby altering its viscosity, a gravity tank in the various branches each supplying oil at a different viscosity, overflow pipes from the gravity tanks to the drain tank, overflow pipes from one gravity tank to another, duplicate pumps drawing oil from a common drain tank, a common pipe supplying the coolers and gravity tanks, a series of valves whereby the oil may be directed either through the coolers or through the gravity tanks or through both or may be delivered directly to the parts to be lubricated, a non-return valve situated in the pipe delivering the oil from the cooler and the gravity tanks, whereby if the pressure in one delivery pipe falls too low, oil will automatically pass into it from the other delivery pipe, a second pipe delivering oil from the cooler and the gravity tanks, and an oppositely disposed non-return valve connecting the two delivery pipes, whereby if the pressure in either delivery pipe falls more than a predetermined amount below the pressure in the other delivery pipe, oil will automatically pass from the pipe having the higher pressure to the pipe having the lower pressure, as set forth.

14. The combination in a lubrication system comprising a plurality of branches using a single grade of lubricant, of conduits leading to the parts to be lubricated which require lubricant of different viscosities, a common drain tank collecting lubricant from said parts, separate coolers connected to said conduits for differentially cooling said collected lubricant and thereby altering its viscosity, a gravity tank in the various branches each supplying oil at a different viscosity, overflow pipes from the gravity tanks to the drain tank, overflow pipes from one gravity tank to another, pumps drawing oil from the common drain tank, and delivering it through the coolers in parallel, a series of valves whereby the oil discharged through one cooler passes to a gravity tank and the oil discharged through the other cooler passes directly to the parts to be lubricated, a non-return valve situated in the pipe delivering the oil from the cooler and the gravity tanks whereby if the pressure in one delivery pipe falls too low oil will automatically pass into it from the other delivery pipe, a second pipe delivering oil from the cooler and the gravity tanks, and an oppositely disposed non-return valve connecting the two delivery pipes, whereby if the pressure in either delivery pipe falls more than a predetermined amount below the pressure in the other delivery pipe, oil will automatically pass from the pipe having the higher pressure to the pipe having the lower pressure, as set forth.

In testimony whereof we have signed our names to this specification.

CHARLES ALGERNON PARSONS.
STANLEY SMITH COOK.